United States Patent Office 3,347,825
Patented Oct. 17, 1967

3,347,825
PROCESS FOR COPOLYMERIZATION OF BIS-($\alpha$-HALOALKYL)AROMATIC COMPOUNDS WITH VINYL COMPOUNDS IN THE PRESENCE OF A COUPLING AGENT
John M. Hoyt and Cornelius A. Sprang, Cincinnati, Ohio, assignors to National Distillers and Chemical Corporation, New York, N.Y., a corporation of Virginia
No drawing. Filed Apr. 3, 1964, Ser. No. 357,303
18 Claims. (Cl. 260—47)

This invention relates to a new and improved process for the preparation of arylenedialkylene-olefin copolymers. More specifically, the invention pertains to the copolymerization of bis-($\alpha$-haloalkyl) aromatic compounds and certain vinyl monomers to form copolymers containing recurring arylenedialkylene units and olefin-derived units.

It is already known in the art to prepare simple poly(arylenedimethylene) polymers, such as poly(phenylenedimethylene) or poly(p-xylylene), by pyrolyzing p-xylene vapors at very high temperatures and short contact times. M. Szwarc, Nature, 160, 403 (1947); Faraday Soc. Discussions, 2, 46 (1947); J. Chem. Phys., 16, 128 (1948); J. Polymer Sci., 6, 319 (1951); British Patents 650,947 and 673,651. Various p-xylene analogs, such as 2-chloro-p-xylene, 2-fluoro-p-xylene, 1,4-dimethylnaphthalene and 2,5-dimethylpyrazine have also been converted to the corresponding polymers by the pyrolysis method. It is also known in the art to prepare poly(p-xylylene) and related polymers by Hofmann degradation procedures comprising the dry pyrolysis of certain trimethyl(o-and p-methylbenzyl) ammonium hydroxides (U.S. Patent No. 2,757,146) and the decomposition of the hydroxides or the related quaternary halide salts in a boiling 5 N aqueous solution of an alkali metal hydroxide (U.S. Patent No. 2,999,820).

Poly(arylenedimethylenes) of this general type have also been prepared from the corresponding bis-(halomethyl)aromatic compounds such as $\alpha,\alpha'$-dichloro-p-xylene or $\alpha,\alpha'$-dibromo-p-xylene by using such highly-reactive coupling agents as metallic sodium (R. A. Jacobson, J. Am. Chem. Soc., 54, 1513 (1932); sodium-potassium alloy or metallic lithium (J. Golden, J. Chem. Soc., 1604 (1961); and metallic magnesium (R. A. Jacobson, supra; W. Carothers, Chem. Rev., 8, 353 (1931); and lithium alkylis (J. Golden, supra). The reaction of metallic magnesium with o- and p-chloromethylbenzyl methyl ethers yields the corresponding o- and p-xylylene polymers (F. G. Mann and F. H. C. Stewart, J. Chem. Soc., 2826 (1954).

Recently, poly(arylenedimethylene) polymers have been prepared by reacting certain dialkylaromatic compounds with peroxides (V. V. Korshak, S. L. Sosin and V. P. Alekseeva, J. Polymer Sci., 52, 213 (1961). For example, p-diisopropylbenzene is converted to poly($\alpha,\alpha$, $\alpha',\alpha'$-tetramethyl-p-xylylene) by heating with two moles of di-tert-butyl peroxide.

These various polymerization processes have been found to suffer from a number of serious disadvantages. For one thing, the selection of starring materials in the pyrolytic process somewhat limited, because many substituents would readily decompose under the drastic conditions for making phenylenedimethylene polymers where temperatures of the order of 800° to 1300° C. are required, for example, in the pyrolysis of xylene-type hydrocarbons. It is also disclosed in the art that only para-phenylenedimethylene polymers can be produced by the pyrolytic method from xylene-type hydrocarbons. The pyrolysis of o-xylene does not yield a polymer product apparently because of side reaction leading to anthracene derivatives. Undesirable side reactions, which would limit yields and molecular weight of the products, are also encountered when the highly reactive coupling agents such as sodium, lithium, magnesium, sodium-potassium alloy, and lithium alkyls are used for the polymerization of bis-(haloalkyl) aromatic compounds which contain sensitive substituents as hereinafter disclosed.

Prior art efforts to prepare copolymers of arylenedialkylenes with olefinic monomers have mostly been unsuccessful. Attempts to condense p-xylylene with styrene or butadiene, or to bubble p-xylylene vapor through a solution containing these monomers have been reported to fail (L. A. Errede and M. Szwarc, Quart. Rev. 12, No. 4, 301 (958). Similar techniques have been reported to be unsuccessful by others (H. Kaufman, H. F. Mark and R. B. Mesrobian, J. Polymer Sci. 13, 3 (1954), R. S. Corley, H. Haas, M. Kane and D. I. Livingston, ibid., 13, 137 (1954); L. A. Auspos, C. W. Burnum, L. A. R. Hall, J. K. Hubbard, W. Kirk, Jr., J. R. Schaefgen and S. B. Speck, ibid, 15, 19 (1955), all of whom used the pyrolysis of p-xylene to obtain p-xylylene. By mixing olefinic monomer vapors with a p-xylylene-containing gas stream emerging from the pyrolysis furnace Auspos et al. obtained copolymers of p-xylylene with maleic anhydride and with chloroprene. Minor amounts of acrylonitrile were also incorporated. These copolymeric products were not well characterized, however, as to solubility, inherent viscosity, ratio of comonomers combined, etc.

It is also known to the art to make solutions of p-xylylene in solvents such as n-hexane, a chloroform-carbon tetrachloride mixture and toluene, by condensing the p-xylene pyrolysis stream in these solvents cooled to −80° C. (U.S. Patent 2,914,511; J. Am. Chem. Soc., 79, 4952 (1957). While it might be supposed that simple mixing of these relatively stable solutions of p-xylylene at −80° C. with various olefinic monomers would yield copolymers, such is not the case, and it has been reported that virtually unmodified poly(p-xylylene) homopolymer is obtained when n-hexane solutions of p-xylylene are mixed at a one to one volume ratio with the following olefinic monomers: vinyl ethyl ether, vinyl acetate, vinyl chloride, acrylonitrile, acrylamide, methyl acrylate, methyl methacrylate, styrene, p-chlorostyrene, butadiene, diethyl maleate, diethyl furmarate, maleic anhydride and ketene (L. A. Errede and J. M. Hoyt, J. Am. Chem. Soc., 82, 436 (1960)). However, the latter authors have reported that xylyleneolefin copolymers were obtained by using an inverse addition technique, in which the cold (−80° C.) solution of p-xylylene was added to a large excess of certain olefinic monomers heated to an elevated temperature. This technique was successful with maleic anhydride, diethyl maleate, diethyl fumarate, acrylonitrile, n-butyl acrylate and styrene. All these copolymers were thermoplastic, and the p-xylylene maleic anhydride copolymer was approximately 1:1 in composition and was soluble in warm dilute aqueous NaOH solution. Further characterization of the remaining copolymers prepared by this technique has not been reported.

While the above-described inverse addition technique is successful with a limited group of olefinic monomers, it has inherent in it all the disadvantages of the pyrolytic method of producing the p-xylylene component, such as the limited choice of substituents which may be present in the xylene-type compound being pyrolyzed, due to the drastic pyrolysis conditions (800°–1300° C.); the frequently low yield of the xylylene monomers obtainable, especially when these are substituted; and the fact that p-xylylene solutions are stable only at low temperatures (−80° C.), have to date only been obtained in relatively low concentrations (up to ~0.15 M), and are sensitive to oxygen.

It has not been reported whether arylenedialkylene-olefin copolymers can be prepared when the arylenedialkylene component is generated by the Hofmann degradation method, as for example, in the generation of p-xylylene from trimethyl(p-methylbenzyl) ammonium hydroxide or chloride (F. S. Fawcett, U.S. Patent 2,757,146; T. E. Young, U.S. Patent 2,999,820). However, certain disadvantages can be envisioned for such a procedure, namely, that the synthesis of the quaternary ammonium salts is often complicated and difficult, and that the dry pyrolysis of the quaternary hydroxide or the decomposition of the quaternary halide salt or hydroxide in boiling 5 N aqueous alkali metal hydroxide solution imposes serious restrictions on the choice of both the quaternary salt and olefinic monomer which can be used.

Neither is it known to the art to prepare arylenedialkylene-olefin copolymers by generating the arylenedialkylene component in the presence of the olefin by dehalogenating the required bis-(α-haloalkyl)aromatic compound with such highly-reactive and little-selective chemical coupling agents as metallic sodium, metallic lithium, sodium-potassium alloy, metallic magnesium and lithium alkyls.

One object of the present invention is to provide an effective process for the copolymerization of bis-(α-haloalkyl)aromatic compounds and various olefinic compounds.

Another object of this present invention is to provide a copolymerization process for bis-(α-haloalkyl)aromatic compounds and various olefinic compounds which avoids the difficulties and/or limitations encountered in the prior art processes.

A further object of the present invention is to provide a process to produce copolymeric products in a soluble, high molecular weight, thermoplastic form in which the ratio of the arylenedialkylene units to vinylene units may be varied over a wide range.

These and other objects of the present invention will become readily apparent from the ensuing description.

In accordance with the present invention it has now been found that copolymeric products can be effectively prepared by reacting one or more bis-(α-haloalkyl)aromatic compounds with a lower valent transition metal salt in the presence of various olefinic compounds in a slurry or solution. The resulting copolymers are true copolymers in which the macromolecule chains contain arylenedialkylene units as well as the alkylene units derived from the olefinic compounds. In general, the reaction is carried out at a temperature less than about 300° C., and the lower valent transition metal salt is dissolved in a hydroxylic solvent. More specific operating conditions include a reaction temperature within the range of about −30° to 300° C., preferably about 0° to 100° C.; and pressures which may range from about 1 to 1000 p.s.i.a., and preferably about 1 to 100 p.s.i.a. It is also preferred to carry out the polymerization reaction in an inert atmosphere in order to avoid oxidation of the lower valent transition metal salt. Illustrative inert gases include nitrogen, argon, methane, helium, mixtures thereof, and the like.

The lower-valent transition metal salt solution is obtained by a reduction process, for example, by reacting a solution of a higher valent metal salt with a metal such as zinc or by electrolytic reduction. Alternatively, the higher valent salt in the anhydrous state may be reduced with hydrogen and the lower valent salt obtained may then be dissolved in the hydroxylic solvent in an inert atmosphere. It is within the scope of the invention to recycle such transition metal salt solutions, after the polymerization process has been completed and the transition metal salt is in a valent state higher than the initial state, by again subjecting said solutions of higher valent transition metal salts to suitable reduction processes. Continuous in situ regeneration of the lower valent transition metal salt is possible by maintaining an excess of reducing metal, e.g., zinc or chromium, in contact with the transition metal solution during the polymerization.

In general, the lower valent transition metals are divalent chromium, divalent vanadium and trivalent titanium; the use of divalent chromium salts is preferred. It was also found preferable to employ a transition metal salt with an anion of a strong acid, i.e., an acid which in 1/10 N aqueous solution has a pH of less than about 2. Such anions include the sulfate, chloride, the phosphate and the like. The use of the sulfate anion ($SO_4^{-2}$) was found to be preferred for the purposes of this invention, and for purposes of illustration the invention will be described more particularly hereinafter in connection with the use of chromous sulfate as the lower valent transition metal salt. Although the foregoing transition metals have been found to be especially useful in carrying out the polymerization process of this invention, other possible lower valent transition metals may be selected from the group consisting of hafnium, zirconium, columbium, tantalum, molybdenum, tungsten, manganese, iron, ruthenium, osmium, cobalt, rhodium, iridium, nickel, palladium, platinum and copper. In accordance with another feature of this invention it has been found helpful to employ the transition metal salt in the form of a solution. The preferred solvents are hydroxylic in nature and include, for example, water, methanol, ethanol, n-propanol, isopropanol, ethylene glycol, and the like. The criteria for the solvent are that it be hydroxylic in nature and be capable of dissolving the lower valent transition metal salt. The use of water as the transition metal salt solvent is especially preferred.

In general, the concentration of the lower valent transition metal salt in the reaction mixture will be within the range of about 0.05 to 4 moles, and preferably about 0.1 to 1 mole per liter of reaction mixture.

As previously noted, at least one of the starting materials for the copolymerization process of this invention is a bis-(α-haloalkyl)aromatic compound wherein the aromatic substituent is an arene such as benzene, xylene, durene, etc.; a heterocyclic such as thiophene, furan, etc.; or a fused ring aromatic such as napthalene, anthracene, tetralin, indane, quinoline, isoquinoline, etc. The polymerization of bis-(α-haloalkyl)arenes by the process of this invention is especially preferred. Although the α-haloalkyl groups may be present at various positions on the aromatic substituent, it is preferred to have them located in the ortho and para positions to each other. The halogen of the α-haloalkyl substituent, is selected from the group consisting of chloride, bromide, iodide, fluoride as well as mixtures thereof. The alkylene portion of the α-haloalkyl substituents, on the other hand, may contain about 1 to 20 carbon atoms and may either be straight or branched chain. However, for most purposes the alkylene portion will contain from about 1 to 8 carbon atoms.

In general, the structural formula for the starting material will be

wherein

X and X' are chlorine, bromine, fluorine or iodine, and the X and X' may be the same or different;

$R_1$, $R_2$, $R_3$ and $R_4$ are fluorine, hydrogen, or lower alkyl groups having from 1 to 3 carbon atoms, either straight or branched chain, aryl groups having from 6 to 10 carbon atoms, and the R substituents may either be the same or different.

Ar is the aromatic substituent which is defined above, and the Ar substituent may be further substituted on the ring, and in various positions, with chlorine, bromine, iodine, cyano, nitro, carboxy, carboalkoxy, or alkyl groups having from 1 to 20 carbon atoms, or alkoxy groups having from 1 to 20 carbon atoms. It will be understood that these groups may be either straight or branched chain.

By utilizing such starting materials, the copolymers prepared in accordance with the process of this invention will contain the following recurring units $$-CR_1R_2-Ar-CR_3R_4-$$

with the various substituents as above defined.

For the purposes of a more complete description, the following is a list of bis-(α-haloalkyl)aromatic compounds which can be effectively employed in the process of this invention:

α,α'-dichloro-p-xylene
α,α'-dibromo-o-xylene
α,α'-difluoro-p-xylene
1,4-bis-(α-chloroisopropyl)benzene
2,5-bis-(chloromethyl)-p-xylene
α,α'-dichloro-2-nitro-p-xylene
α,α'-dichloro-2,5-dicyano-p-xylene
α,α'-dichloro-4-carbomethoxy-o-xylene
α,α'-dichloro-α,α'-diphenyl-p-xylene
2,5-bis-(chloromethyl)-1,4-dimethoxybenzene
4,5-bis-(chloromethyl)-1,2-dimethoxybenzene
4,5-bis-(chloromethyl)-o-xylene
α,α',2,3,5,6-hexachloro-p-xylene
1,4-bis-(difluorochloromethyl)-2,3,5,6-tetrafluorobenzene
1,2-bis-(difluorochloromethyl)-3,4,5,6-tetrachlorobenzene
1,4-bis-(chloromethyl)naphthalene
5,8-bis-(chloromethyl)tetralin
5,6-bis-(chloromethyl)indane
bis-(chloromethyl)durene
1,4-dibromo-1,2,3,4-tetrahydronaphthalene
1,4-dichloro-1,4-dihydronaphthalene
1,3-dichloroindane
2,5-bis-(chloromethyl)thiophene
2,5-bis-(chloromethyl)furan
5,8-bis-(chloromethyl)quinoline
5,8-bis-(chloromethyl)isoquinoline
5,6-bis-(chloromethyl)quinoline
6,7-bis-(chloromethyl)-4-chloroquinoline
9,10-bis-(chloromethyl)anthracene
9,10-bis-(chloromethyl)-1-methylanthracene
9,10-bis-(chloromethyl)phenanthrene In general, it has been found desirable to employ one or more of the above compounds with a solvent therefor. The essential requirements of this solvent is that it dissolve the bis-(α-haloalkyl)aromatic compound, and that it be partially or, even more desirable, completely miscible with the coupling agent composition comprising the hydroxylic solvent and the lower valent transition metal salt. Examples of such solvents are methanol, acetone, p-dioxane, tetrahydrofuran, and the like. The amount of this solvent employed may vary over a wide range, and it will be understood that only enough solvent need be employed which will dissolve the bis-(α-haloalkyl)aromatic compound.

The olefinic compounds which may be copolymerized by the process of this invention have the general structure $$R_5CH=CR_6R_7$$

wherein $R_5$ is selected from the group consisting of hydrogen, cyano or aryl radicals having from 6 to 10 carbon atoms;
$R_6$ is selected from the group consisting of hydrogen, a lower alkyl group having from 1 to 6 carbon atoms, and a COOR radical wherein R is an alkyl group having from 1 to 12 carbon atoms;
$R_7$ is selected from the group cnsisting of hydrogen, a CN radical, a $NO_2$ radical, a COOH radical, a lower alkyl having from 1 to 6 carbon atoms, a $CH_2COOR$ or a COOR radical wherein R is a lower alkyl having from 1 to 12 carbon atoms, a $CONH_2$ radical, CONHR' or $CONR'_2$ radicals wherein R' is a lower alkyl group having from 1 to 6 carbon atoms, or an aryl group.

For the purposes of a more complete description, the following is a list of olefinic compounds which can be employed in the process of this invention:

styrene
p-chlorostyrene
methyl acrylate
methyl methacrylate
acrylamide
N,N-dimethylacrylamide
acrylonitrile
diethyl itaconate
ethyl cinnamate
cinnamonitrile
fumaronitrile
omega-nitrostyrene In general, the solvents employed for the bis-(α-haloalkyl)aromatic compound are also used to dissolve the olefinic compound. In some instances it is also possible to use the olefinic comonomer as the solvent for the bis-(α-haloalkyl)aromatic compound. The mole ratio of the bis-(α-haloalkyl)aromatic compound to the olefinic compound will be about 100/1 to 1/100, and preferably about 100/5 to 5/100.

Other reaction conditions, not necessarily critical or essential, include a concentration of the bis-(α-haloalkyl) aromatic compound in the reaction mixture which ranges from about 0.025 to 2 moles, preferably about 0.05 to 0.5 mole per liter of reaction mixture. Although the reaction will proceed without agitation, some degree of agitation or stirring during the reaction has been found helpful. Also, the order of addition of the materials to the reaction zone may be varied especially at the lower reaction temperatures; in general, however, the bis-(α-haloalkyl)aromatic compound solution plus the olefinic compound is added to the lower valent transition metal salt solution. It will also be understood that the addition of the bis-(α-haloalkyl)aromatic compound and olefinic compound solution may either be at one time or in increments throughout the reaction period. Preferably, the solution of the starting material is added over a period which may extend from about 3 seconds to about 1 hour.

In accordance with one method of carrying out the copolymerization process of this invention, a mixture of bis-(α-haloalkyl)aromatic compound and an olefinic compound in a solvent miscible with water or with other hydroxylic solvents, such as, for example, acetone or p-dioxane, is added over a period of 1 min. to 1 hour at room temperature to a stirred solution of a lower-valent transition metal salt, for example, chromous sulfate in water or another hydroxylic solvent such as an alcohol or glycol. The resulting mixture is stirred and allowed to react at room temperature for ½ to about 4 hours and then heated and stirred at reflux for a period of ½ to about 4 hours. The copolymeric product is recovered by dilution with water and filtration and is purified from inorganic material by washing with water or dilute (5%) aqueous hydrochloric acid solution and finally by extracting with acetone to remove unreacted substances and low polymers. The copolymer is then dried in vacuum.

It is also possible to add the mixture of bis-(α-haloalkyl)aromatic compound and the olefinic compound at once to the lower-valent transition metal salt solution and then carry out the copolymerization by holding at room temperature for a period of ½ to 4 hours and finally by heating to reflux for ½ to 4 hours. Alternatively, the mixture of the bis-(α-haloalkyl)aromatic compound and the olefinic compound may be added slowly or at once to the lower-valent transition metal salt solution held at an elevated temperature, for example, at reflux temperature. It is also possible to mix the olefinic compound with the lower-valent transition metal salt solution and add to this mixture, slowly or at once at room temperature, or at an elevated temperature, the bis-(α-haloalkyl)aromatic compound or compounds.

The copolymerization with vinyl comonomers with arylenedialkylene units is believed to be similar in nature to a vinyl copolymerization, except that the arylenedialkylenes are very prone to homopolymerize and if good copolymerization is to be achieved, conditions tending to minimize such homopolymerization must be maintained. High vinyl monomer concentration and slow rates of arylenedialkylene generation are believed to favor copolymerization with vinyl comonomers. Even when these precautions are observed it is believed that the arylenedialkylene-olefin copolymers of this invention tend to be block copolymeric in nature, i.e., that both types of repeat units are present in relatively long sequences.

The invention will be more fully understood by reference to the following illustrative embodiments.

EXAMPLE I

*Preparation of a p-xylylene/styrene copolymer*

A 200-ml., 3-necked glass reaction-flask was equipped with heating mantle, mechanical stirrer, thermometer, nitrogen inlet, and reflux condenser connected to an oil-bubbler. The system was flushed out with nitrogen and a nitrogen flow was maintained throughout the reaction period. To the flask was added 65 ml. of 1.05 N aqueous $CrSO_4$ solution (68 millimoles $CrSO_4$) prepared from $Cr_2(SO_4)_3 \cdot 15H_2O$ and Zn by the method of C. E. Castro, J. Am. Chem. Soc., 83, 3262 (1961). To the stirred $CrSO_4$ solution was added, over a period of about 1 minute at room temperature, a solution of 3.50 g. (20 millimoles) of α,α'-dichloro-p-xylene and 3.00 g. (28.8 millimoles) of styrene (inhibited) dissolved in 33 ml. of nitrogen-sparged p-dioxane. The resulting mixture was stirred at room temperature for 2 hours, little change in the blue color of $CrSO_4$ being noted. On heating to 68° C. a rapid color change to green was noted. Heating and stirring were continued at 68°–70° C. for 3 hours. After the reaction mixture had cooled it was diluted with about two-thirds of its volume of water and a few ml. of acetone. The solid present was collected, washed with water, boiled in dilute HCl solution, collected, washed with water, extracted 2 hours with acetone in a Soxhlet apparatus and dried. A total of 2.59 g. of white granules was obtained. Since the maximum yield of poly(p-xylylene) obtainable from this experiment is 2.08 g. it is evident that styrene has been combined in the polymeric product. This polymeric product was pressed at 300° C. at 24,000 lbs. to form a milk-white fused sheet which was tough and flexible. The infra-red absorption spectrum of the copolymer showed strong absorption at 820 cm.$^{-1}$, characteristic of para-disubstituted aromatic rings, confirming the presence of p-xylylene units. Strong bands were also found at 753 and 697 cm.$^{-1}$, which are characteristic of mono-substituted aromatic rings, and confirm the presence of styrene units. The polymer had an inherent viscosity of 0.75 (0.39 g. polymer per 100 ml. solvent) in benzyl benzoate at 305° C. determined by the method of T. E. Young, U.S. Patent 2,999,820, Sept. 12, 1961, and J. R. Schaefgen, J. Polymer Sci., 41, 133 (1959).

EXAMPLE II

*Copolymerization of p-xylylene with methyl methacrylate*

In an apparatus and in a manner similar to that described in Example I, a solution of 3.5 g. (20 millimoles) of α,α'-dichloro-p-xylene and 2 g. (20 millimoles) of methyl methacrylate dissolved in 30 ml. of dioxane was added over a period of 1 hour at room temperature to 60 ml. of a stirred aqueous 1.1 N solution of $CrSO_4$ (66 millimoles $CrSO_4$). The reaction was continued at room temperature for 1½ hours and then heated to 65–75° C. for 2¼ hours. The reaction mixture was diluted with 400–500 ml. of water. The solid copolymer was collected, washed with hot 5% aqueous HCl solution and extracted with acetone in a Soxhlet apparatus for 2½ hours. A total of 2.10 g. of a white granular solid polymer was obtained. This polymer had a polymer melt temperature of 182° C. determined on a Dennis bar according to the method of W. R. Sorenson and T. W. Campbell, "Preparative Methods of Polymer Chemistry," Interscience Publishers, Inc., New York, N.Y., 1961, p. 41. The infra-red absorption spectrum obtained with the polymer showed a strong band at 820 cm.$^{-1}$, characteristic of p-disubstituted benzene rings, confirming the presence of p-xylylene units, and a strong band of 1725 cm.$^{-1}$, characteristic of carbonyl group, as well as absorption in the 1100–1275 cm.$^{-1}$ region, characteristic of —C—O—C linkage, both of which confirm the presence of methyl methacrylate-derived units in the polymer. Analysis of the copolymer showed the presence of 83.25% carbon, 8.05% hydrogen and 7.82% oxygen (direct oxygen determination). Correcting for the 0.88% combustion residue, assumed to be ash, the analysis become: C, 83.99%; H, 8.12%; O, 7.89%. This composition corresponds well to a copolymer containing 26 mole percent methyl methacrylate-74 mole percent p-xylylene (Theoretical: C, 84.15%; H, 7.77%; O, 8.08%).

The copolymer had an inherent viscosity of 1.15 in benzyl benzoate at 305° C. (0.39 g. per 100 ml. solvent) determined as in Example 1. The X-ray diffraction pattern showed lines as follows: 5.27 (weak), 4.50 (weak), 3.98 (very weak), 3.39 (very weak), and 3.00 A. (very weak). Nickel-filtered Cu radiation at 45 kv., 15 ma. was used, employing a Geiger tube at 1320 volts as detector.

EXAMPLE III

*Copolymerization of p-xylylene with methyl methacrylate*

In an apparatus and in a manner similar to that described in Example I, a solution of 3.5 g. (20 millimoles) of α,α'-dichloro-p-xylene and 4.17 g. (41.7 millimoles) of methyl methacrylate dissolved in 30 ml. of p-dioxane was added at room temperature over a period of 1 hour to 60 ml. of a 1.1 N stirred aqueous solution of $CrSO_4$ (66 millimoles). The reactants were stirred an additional 1½ hours at room temperature and then heated with stirring at 67–75° C. for 2½ hours longer. The reaction mixture was added to 400–500 ml. of water and filtered. The solid obtained was washed with 250 ml. of hot 5% aqueous hydrochloric acid solution, collected and extracted with acetone in a Soxhlet apparatus for 2½ hours and dried in vacuum. A total of 2.58 g. of pale green, somewhat flexible granules was obtained, which exhibited a polymer melt temperature of 178° C., determined as in Example II. This polymer had an inherent viscosity of 0.85 in benzyl benzoate at 305° C. (0.39 g. per 100 ml. solvent), determined as described in Example 1. The infra-red spectrum of the copolymer had a strong band of 822 cm.$^{-1}$, characteristic of p-disubstituted benzene rings, and a strong band of 1725 cm.$^{-1}$, for carbonyl and absorption in the 1100–1275 cm.$^{-1}$ region for the C—O—C group. The polymer was pressed out at 280° C. into translucent, milky white film which was very flexible and fairly tough. Analysis of this polymer showed the presence of 77.85% carbon, 7.81% hydrogen, and 12.84% oxygen (direct oxygen analysis), and 1.50% residue. Assuming the combustion residue is ash, this analysis becomes: C, 79.04%; H, 7.93% and O, 13.02%, which corresponds very closely to a 40/60 mole percent methyl methacrylate/p-xylylene copolymer (Theoretical: C, 79.05%; H, 7.82%; O, 13.13%).

The X-ray diffraction pattern showed lines as follows: 5.21 (m), 4.44 (vw), 3.98 (vw), 3.04 (vw), and 2.12 A. (vw).

EXAMPLE IV

*Copolymerization of p-xylene with methyl methacrylate*

In an apparatus, and in a manner similar to that described in Example I, a solution of 14 g. (80 millimoles) of α,α'-dichloro-p-xylene and 8 g. (80 millimoles) of methyl methacrylate dissolved in 80 ml. of acetone was added over a period of ½ hour at room temperature to a stirred mixture of 80 ml. of acetone and 285 ml. of 1.08 N aqueous chromous sulfate (308 millimoles). The resulting mixture was stirred 1½ hours at room temperature and then heated at 55–65° C. for 3½ hours. The loss of acetone during the heating period was compensated by occasional addition of fresh acetone. The polymer was isolated as described in Example III. A total of 9.60 g. of acetone-insoluble copolymer was obtained as a free-flowing powder. It had an inherent viscosity of 1.2 in benzyl benzoate at 305° C. (0.39 g. per 100 ml. solvent) determined as described in Example I. The polymer melt temperature was 185° C., determined as in Example I. The infra-red absorption spectrum obtained from this copolymer showed strong band at 820 cm.$^{-1}$ characteristic of p-disubstituted benzene, rings, confirming the presence of p-xylylene units, as well as a strong band of 1725 cm.$^{-1}$ characteristic of the C=O group and absorption in the 1100–1275 cm.$^{-1}$ range, characteristic of the

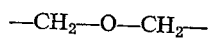

group, both confirming the presence of the methyl methacrylate unit in the copolymer. A specimen of the copolymer was compression molded at 280° C. into a well-fused, flexible, tough film. This film had a tensile yield strength of 5,500 p.s.i. Another specimen, compression molded at 250° C., did not fuse as completely but had good flexibility, was tough, and had a tensile yield of 4,900 p.s.i., an ultimate yield of 4,400 p.s.i. and an elongation of 100% at break.

EXAMPLE V

*Copolymerization of p-xylene with ethyl cinnamate*

In an apparatus, and in a manner, similar to that described in Example I, a solution of 3.5 g. (20 millimoles) of α,α'-dichloro-p-xylene and 3.0 g. (17 millimoles) of ethyl cinnamate dissolved in 50 ml. of acetone was added at room temperature over a period of 40 minutes to 50 ml. of a stirred 1.05 N aqueous solution of CrSO$_4$. The mixture was stirred about 1 hour at room temperature, then heated to 50° C., held at that temperature for 1 hour, finally heated at 60–70° C. for 3 hours, and then allowed to cool and stand overnight. The copolymeric product was isolated in the usual manner, as described in Example I. A total of 1.27 g. of white brittle solid was obtained, which had a polymer melt temperature of 165° C., determined as in Example II. The presence of both ethyl cinnamate units and p-xylene units in the copolymer was confirmed by the infra-red absorption spectrum of the material which showed strong carbonyl absorption at 1725 cm.$^{-1}$ and multiple bands in the region of 1100–1275 cm.$^{-1}$ for the ester C—O—C group, as well as absorption at 825 cm.$^{-1}$ for p-disubstituted benzene nuclei and a band at 700 cm.$^{-1}$ for the monosubstituted phenyl group. A specimen of the copolymer was compression molded at 200° C. to form a well-fused film which was quite brittle and possessed little strength. The copolymer had an inherent viscosity of 0.90 in benzyl benzoate at 305° C. (0.39 g. per 100 ml. solvent), determined as described in Example I. Analysis indicated this copolymer contained about 76 mole percent p-xylene and 24 mole percent ethyl cinnamate.

*Analysis.*—Calcd. for 76/24 p-xylene/ethyl cinnamate: C, 86.22%; H, 7.44%. Found: C, 86.28%; H, 7.51%.

The X-ray diffraction-pattern indicated a low degree of crystallinity and showed lines as follows: 5.25 (w), 4.50 (w) and 4.39 A. (w).

EXAMPLE VI

*Preparation of a copolymer of p-xylene and acrylonitrile*

In an apparatus and in a manner similar to that described in Example I a nitrogen-sparged solution of 3.50 g. (20 millimoles) of α,α'-dichloro-p-xylene and 2.01 g. (38 millimoles) of acrylonitrile (inhibited) in 30 ml. of p-dioxane was added over a period of 30 minutes to a stirred solution of 70 ml. of 1.10 N aqueous CrSO$_4$ (77 millimoles CrSO$_4$) held at 70° C. After the addition was complete the contents of the flask were heated and stirred at 70° C. for two hours. After dilution of the cooled reaction mixture with water the white solid present was collected, washed with water, digested with boiling dilute aqueous HCl solution, collected, washed with water, extracted with acetone for 2¼ hours in a Soxhlet apparatus and dried in vacuo. A total of 1.83 g. of a fine white powder was obtained which contained 2.16, 2.39% nitrogen.

EXAMPLE VII

*Copolymerization of p-xylene with diethyl itaconate*

In an apparatus, and in a manner similar to that described in Example I, a solution of 3.5 g. (20 millimoles) of α,α'-dichloro-p-xylene and 3 g. (16.2 millimoles) diethyl itaconate in 100 ml. nitrogen-sparged acetone was rapidly added at room temperature to a stirred solution of 60 ml. of 1.13 N aqueous CrSO$_4$ (68 millimoles CrSO$_4$) and 100 ml. nitrogen-sparged water. The resulting mixture was stirred for ½ hour at room temperature and then heated to 60° C. and maintained at that temperature, with stirring, for 4 hours. A slow change in the reaction mixture from blue to light green was observed. The copolymer was isolated as described in Example II. A total of 2.00 g. of acetone-insoluble white crumb was obtained, which had a polymer melt temperature of 144° C., determined as in Example II. The presence of both ethyl itaconate and p-xylene units in the polymer was confirmed by the infra-red absorption spectrum which contained a band for carbonyl at 1730 cm.$^{-1}$, a band at 1175 cm.$^{-1}$ for the ester C—O—C group, as well as a band at 825 cm.$^{-1}$ for the p-disubstituted aromatic nucleus. The copolymer had an inherent viscosity of 1.0 in benzyl benzoate at 305° C. (0.39 g. per 100 ml. solvent) determined as described in Example I. A specimen of the copolymer was compression molded at 240° C. to form a flexible tough, elastic film.

The X-ray diffraction pattern showed lines as follows: 5.04 (w), 4.00 (w), 3.68 (vw), 2.87 (vw) and 2.15 A. (vw).

Analysis showed the copolymer contained about 79 mole percent p-xylene and 21 mole percent diethyl itaconate.

*Analysis.*—Calcd. for 79 mole percent p-xylene and 21 mole percent diethyl itaconate: C, 81.24%; H, 7.69%. Found: C, 79.80%; H, 7.65%; combustion residue, 1.6% or C, 81.09%; H, 7.77% on residue-free basis.

The above data show that the process of this invention is effective for producing copolymers from bis-(α-haloalkyl)aromatic compounds and various olefinic compounds. Such copolymers are useful for preparing coatings, films and molded articles.

While particular embodiments of this invention are shown above, it will be understood that the invention is obviously subject to variations and modifications without departing from its broader aspects.

What is claimed is:

1. A copolymerization process which comprises reacting at least one bis-(α-haloalkyl)aromatic compound, capable of copolymerization, having the formula

wherein X and X' are selected from the group consisting of chlorine, bromine, iodine, fluorine and mixtures thereof;

$R_1$, $R_2$, $R_3$, and $R_4$ are selected from the group consisting of hydrogen, fluorine, lower alkyl group having from 1 to 3 carbon atoms, aryl group having from 6 to 10 carbon atoms, and mixtures thereof; Ar is an aromatic substituent selected from the group consisting of arenes, aromatic reterocyclics, and fused ring aromatics with a lower valent transition metal salt, and with an olefinic compound having the formula $$R_5CH=CH_6R_7$$

wherein $R_5$ is selected from the group consisting of hydrogen, cyano and aryl radicals;

$R_6$ is selected from the group consisting of hydrogen, at lower alkyl group having from 1 to 6 carbon atoms, and a COOR radical wherein R is an alkyl group having from 1 to 12 carbon atoms;

$R_7$ is selected from the group consisting of hydrogen, a CN radical, a $NO_2$ radical, a COOH radical, a lower alkyl having from 1 to 6 carbon atoms, $CH_2COOR$, a COOR radical, wherein R is a lower alkyl having from 1 to 12 carbon atoms, a $CONH_2$ radical, a CONHR' radical, and a CONR'$_2$ radical wherein R' is a lower alkyl group having 1 to 6 carbon atoms, at a temperature within the range of about −30° to 300° C.

2. The process of claim 1 wherein said bis-(α-haloalkyl)aromatic compound is a bis-(α-haloalkyl)arene.

3. The process of claim 2 wherein said bis-(α-haloalkyl)arene is α,α'-dichloro-p-xylene.

4. The process of claim 2 wherein said bis-(α-haloalkyl)arene is α,α'-dibromo-o-xylene.

5. The process of claim 2 wherein said bis-(α-haloalkyl)arene is 2,5-bis-(chloromethyl)-1,4-dimethoxybenzene.

6. The process of claim 2 wherein said bis-(α-haloalkyl)arene is α,α',2,3,5,6-hexachloro-p-xylene.

7. The process of claim 2 wherein said bis-(α-haloalkyl)arene is bis-(chloromethyl)durene.

8. The process of claim 1 wherein said olefinic compound is diethyl itaconate.

9. The process of claim 1 wherein said transition metal salt has a cation selected from the ground consisting of divalent chromium, divalent vanadium and trivalent titanium.

10. The process of claim 9 wherein said transition metal salt is chromous sulfate.

11. A copolymerization process which comprises reacting a solution of (1) at least one bis-(α-haloalkyl)arene, capable of copolymerization, having the formula $$X—CR_1R_2ArCR_3R_4—X'$$

wherein X and X' are selected from the group consisting of chlorine, bromine, iodine, fluorine and mixtures thereof;

$R_1$, $R_2$, $R_3$ and $R_4$ are selected from the group consisting of hydrogen, fluorine, lower alkyl group having from 1 to 3 carbon atoms, aryl group having from 6 to 10 carbon atoms, and mixtures thereof; Ar is a divalent arene radical; and (2) an olefinic compound having the formula $$R_5CH=CR_6R_7$$

wherein $R_5$ is selected from the group consisting of hydrogen, cyano, and aryl radicals;

$R_6$ is selected from the group consisting of hydrogen, a lower alkyl group having from 1 to 6 carbon atoms, and a COOR radical wherein R is an alkyl group having from 1 to 12 carbon atoms;

$R_7$ is selected from the group consisting of hydrogen, a CN radical, an $NO_2$ radical, a COOH radical, a lower alkyl having from 1 to 6 carbon atoms, a $CH_2COOR$ radical, a COOR radical wherein R is a lower alkyl having from 1 to 12 carbon atoms, a $CONH_2$ radical, a CONHR' radical, a CONR'$_2$ radical, wherein R' is a lower alkyl group having 1 to 6 carbon atoms and an alkyl group with a hydroxylic solution of a lower valent transition metal salt, to effect copolymerization under an inert atmosphere at a temperature within the range of about −30° to 300° C. and a pressure of about 1 to 1000 p.s.i.a.

12. The process of claim 11 wherein said arene is α,α'-dichloro-p-xylene and said olefinic compound is styrene.

13. The process of claim 11 wherein said arene is α,α'-dichloro-p-xylene and said olefinic compound is methyl methacrylate.

14. The process of claim 11 wherein said arene is α,α'-dichloro-p-xylene and said olefinic compound is ethyl cinnamate.

15. The process of claim 11 wherein said arene is α,α'-dichloro-p-xylene and said olefinic compound is diethyl itaconate.

16. The process of claim 11 wherein said lower valent transition metal salt is chromous sulfate.

17. The process of claim 11 wherein said hydroxylic solvent is selected from the group consisting of water, methanol, ethanol, propanol, isopropanol, ethylene glycol, and mixtures thereof.

18. The process of claim 11 wherein the solvent for the arene and the olefinic compound is selected from the group consisting of acetone and p-dioxane.

No reference cited.

JOSEPH L. SCHOFER, *Primary Examiner.*

H. WONG, *Assistant Examiner.*